United States Patent [19]

Bent, Jr.

[11] Patent Number: 4,505,483

[45] Date of Patent: Mar. 19, 1985

[54] INFLATABLE SEAL FOR OPENING IN BUILDING WALL

[75] Inventor: Kenneth R. Bent, Jr., Coventry, R.I.

[73] Assignee: Gilmore-Kramer, Inc., Providence, R.I.

[21] Appl. No.: 571,351

[22] Filed: Jan. 16, 1984

[51] Int. Cl.³ .................. F16J 15/02; F16J 15/46; E06B 7/22

[52] U.S. Cl. ........................ 277/34; 181/218; 160/180; 49/477

[58] Field of Search .............. 181/198, 203, 205, 217, 181/218; 160/180; 277/34, 34.3, 34.6; 49/477; 220/225, 232, 240

[56] References Cited

U.S. PATENT DOCUMENTS

| | | | |
|---|---|---|---|
| 2,361,298 | 10/1944 | Laddon | 49/477 X |
| 2,420,186 | 5/1947 | Miller et al. | 160/180 X |
| 2,651,359 | 9/1953 | Margison | 160/180 |
| 2,666,962 | 1/1954 | Tripp | 49/370 X |
| 2,739,645 | 3/1956 | Urquhart | 49/40 X |
| 2,792,599 | 5/1957 | Gantschnigg et al. | 49/477 X |
| 3,303,615 | 2/1967 | O'Neal | 49/477 X |
| 3,347,200 | 10/1967 | Mege | 49/477 X |
| 3,530,925 | 9/1970 | Miller | 49/477 X |
| 3,939,614 | 2/1976 | Frommelt et al. | 49/477 X |
| 4,322,923 | 4/1982 | O'Neal | 49/477 X |

FOREIGN PATENT DOCUMENTS 774550 5/1957 United Kingdom ............... 181/218

Primary Examiner—Robert S. Ward
Attorney, Agent, or Firm—Salter & Michaelson

[57] ABSTRACT

An inflatable seal for sealing the open area between the perimeter of an opening in a wall of a building and the body of a vehicle received in the opening. The seal comprises an inflatable member which is mounted on the wall in the opening and a blower assembly for inflating the inflatable member and for maintaining it in an inflated or expanded disposition wherein it extends inwardly into the opening for sealingly engaging the sides of the vehicle body. The seal further comprises an inner partition in the inflatable member for reducing outward bulging of the walls thereof to thereby maintain the inflatable member in substantially inwardly extending relation in the opening and recoil members are provided for retracting the inflatable member to a position wherein it is adjacent the perimeter of the opening when the blower assembly is deenergized. The seal can compensate for minor misalignments of the vehicle in the opening and provides an effective weatherproof seal around the vehicle body so that repair work or the like can be effected on the portions of the vehicle inside the building.

4 Claims, 7 Drawing Figures

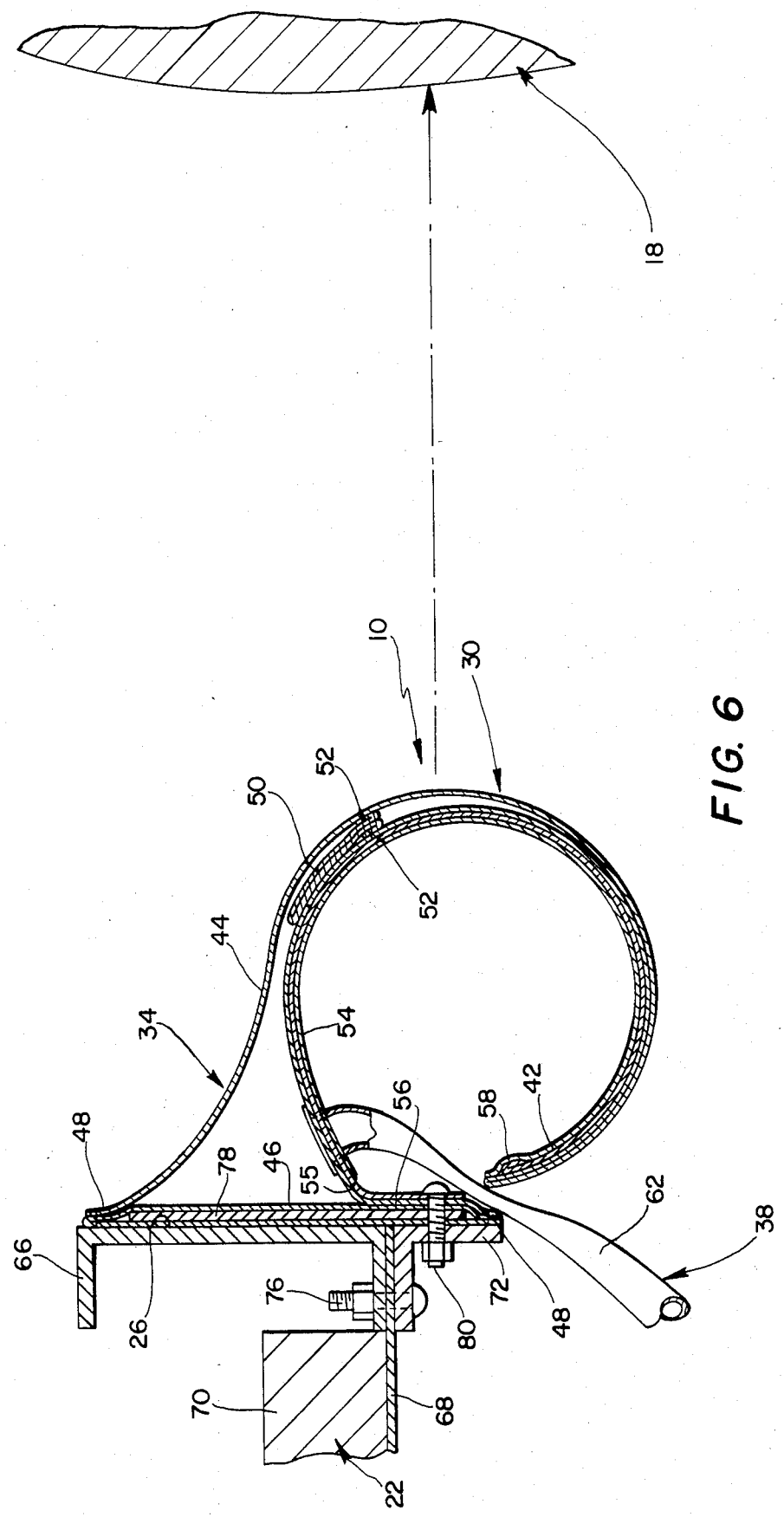

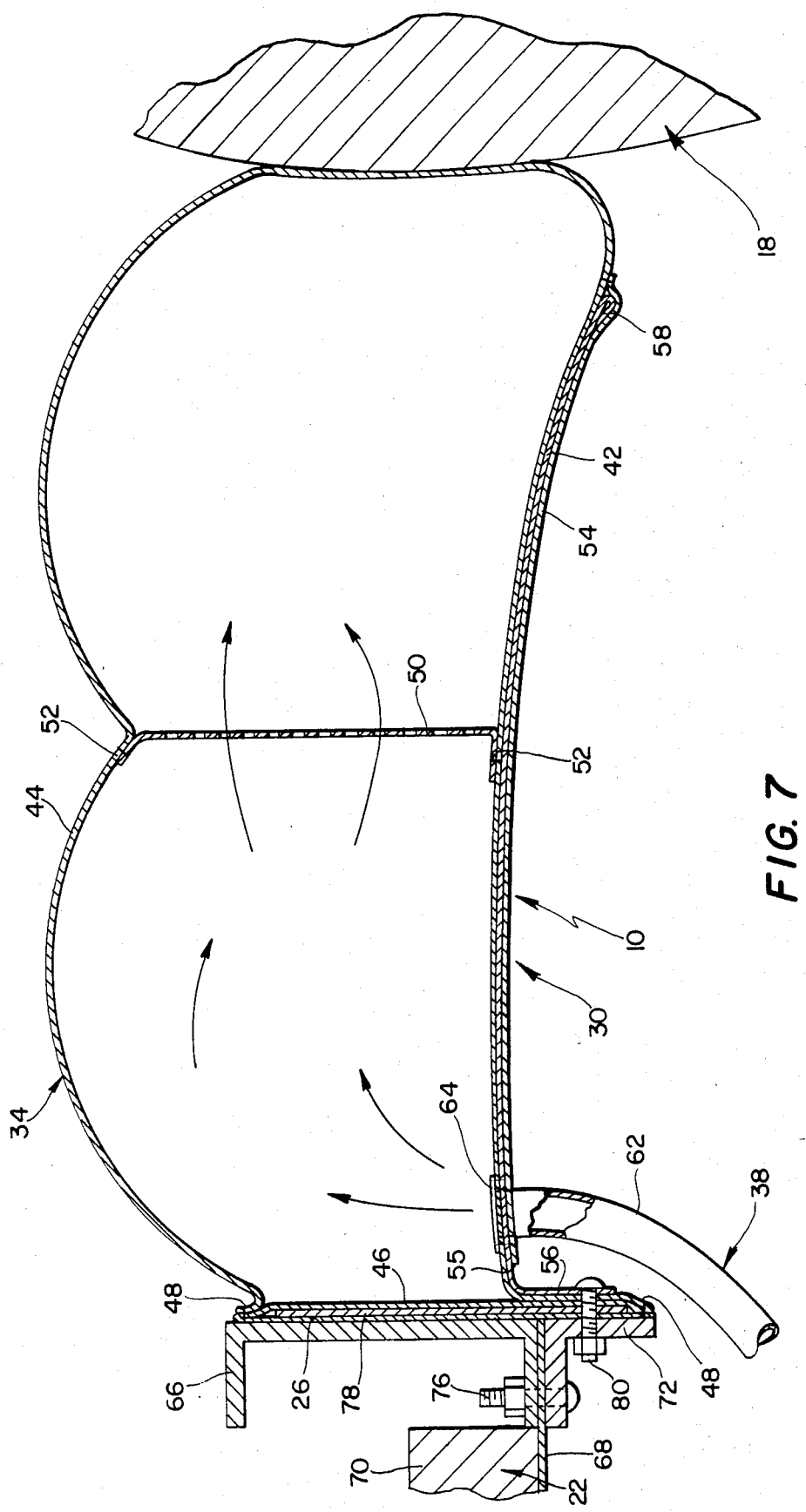

INFLATABLE SEAL FOR OPENING IN BUILDING WALL

BACKGROUND AND SUMMARY OF THE INVENTION

The instant invention relates generally to inflatable seals and more particularly to an inflatable seal for sealing the area between the perimeter of an opening in a wall of a building and the body of a vehicle received in the opening. A number of inflatable seals, of the general type commonly referred to as dock seals, have heretofore been available for sealing the areas between the walls of buildings and the bodies of vehicles when the vehicles are positioned adjacent the exteriors of the buildings, and particularly adjacent loading docks or the like in the building walls. The most common dock seals of this general type have been provided for use in connection with truck loading docks for the purpose of permitting workmen to work under the various types of controlled atmospheric conditions which can be provided in the interiors of buildings during the loading and unloading of trucks. More specifically, it has been generally known to provide an inflatable dock seal which extends outwardly from an exterior building wall around the perimeter of a loading dock opening therein for yieldably engaging the rear end of a tractor-trailer truck adjacent the loading dock for providing a seal between the truck and the building wall. Accordingly, the seal permits a controlled atmosphere associated with the interior of the building to be communicated to the interior of the trailer portion of the truck during loading and unloading operations. Dock seals of this type have been important from the standpoint of preserving the quality of perishable goods, as well as from the standpoint of providing increased comfort for workmen loading and/or unloading trucks. However, none of the heretofore known seals of this general type have been operable or adaptable for use in sealing the area between the perimeter of an opening in a wall of a building and a vehicle which is actually received in the opening so that a portion of the vehicle extends therethrough.

A variety of dock seals of the type constructed for use in connection with loading docks have heretofore been available, and in this regard reference is made to O'Neal U.S. Pat. Nos. 3,303,615; 3,391,502; 3,391,503; and 3,714,745; and Ouellet U.S. Pat. No. 3,994,103. While these references teach a variety of inflatable dock-seal constructions that represent the closest prior art to the instant invention of which the applicant is aware, they do not teach an inflatable seal which is operable for sealing the area around the body of a vehicle received in an opening in a building wall, or an inflatable seal which has the unique structural features of the seal of the instant invention as will hereinafter be made apparent. Hence, these references are believed to be of nothing more than general interest with respect to the seal of the instant invention.

The instant invention addresses and provides a unique solution for the problem of providing a seal between the perimeter of an opening in a building wall and the body of a vehicle, wherein the vehicle body is received through the opening so that a portion of the vehicle is disposed within the building, and the remainder of the vehicle is disposed on the outside thereof. The seal of the instant invention has particular application in the aircraft industry where it is often necessary to perform repairs on huge aircraft such as jumbo jets. The massive sizes of these vehicles frequently makes it impractical for them to be moved into hangars for repair work. On the other hand, weather conditions frequently make it impractical or even impossible to perform the necessary repair work outdoors. For these reasons, there is a need for providing a system whereby only a portion of an airplane can be received in a hangar, and wherein an effective weatherproof seal is provided between the walls of the fuselage of the plane and an opening in a wall of the hanger through which the plane is received. In this regard, it has been found that by providing a hangar wherein a wall thereof includes slidable door panels which are constructed so that when they are in the closed positions thereof they cooperate to define an opening in the wall which is configured and dimensioned to be received around the fuselage of an airplane at a particular point in the extent thereof, an airplane can be partially received in the hangar so that it extends through the opening in the wall and so that a portion of the plane is disposed within the hangar and the remainder of the plane is disposed outside thereof. However, while systems of this general type have been heretofore known, they have been less than satisfactory, because they have not included effective means for sealing the open area between the perimeter of the opening defined by the hangar doors and the fuselage of the plane. Specifically, the known systems of this general type have included various types of foam-rubber seals for this purpose, all of which have been unsatisfactory. In this connection, a foam-rubber seal inherently has a limited degree of compressibility; and as it is compressed it gradually becomes firmer until it reaches the limit of its compressibility. As a result, it can only be used to compensate for very minor variations in the dimensions of the open area between the perimeter of an opening and the wall of a plane. Since aircraft, particularly jumbo jets, are huge pieces of machinery, it is not always possible to precisely orient them in the desired locations; and since even slight misalignments of aircraft cannot normally be accommodated with foam-rubber seals, open areas have frequently been experienced in the known seal systems. Furthermore, these conditions can even exist when aircraft are precisely aligned and oriented in hangars, since the degrees of loading of the planes can substantially affect their vertical dispositions. Accordingly, even if planes are precisely oriented in hangars, open areas have existed in foam-rubber seals around the planes because of the different degrees of loading thereof which are possible.

The instant invention provides a novel device for sealing the open area between the perimeter of an opening in the wall of a building, such as defined by a pair of doors, and the periphery of a vehicle body received in the opening. In particular, the instant invention provides a novel seal for sealing the open area around the fuselage of an airplane when the airplane is received in a hangar in the manner hereinabove described. However, in contrast to the hereinabove described foam-rubber seals heretofore available for this purpose, the inflatable seal of the instant invention effectively compensates for minor misalignments in the position of an aircraft, as well as for various degrees of loading thereof.

The inflatable seal of the instant invention is constructed for mounting in an opening in a wall of a building wherein the opening is dimensioned and configured for receiving a portion of a vehicle body therethrough with the walls of the body in relatively closely spaced relation to the perimeter of the opening. The seal of the instant invention generally comprises a flexible inflatable member mounted on the wall of the building adjacent the perimeter of the opening, the member being inflatable from a deflated or collapsed position to an inflated or expanded disposition wherein it projects inwardly into the opening for sealing engagement with the outer surfaces of the walls of the body of a vehicle received in the opening. In the preferred embodiment, a plurality of spaced outer pockets are provided on the inflatable member, and resilient recoil members are provided in the pockets, the recoil members also being attached to the wall of the building adjacent the perimeter of the opening. The recoil members are formed and positioned so that they are in substantially straightened dispositions wherein they extend inwardly into the opening when the inflatable member is in the expanded disposition thereof and so that they are in resiliently curled or recoiled dispositions wherein they are adjacent the perimeter of the opening when the inflatable member is in the deflated or collapsed disposition thereof. Accordingly, the resilient recoil members add a certain degree of stiffness to the inflatable member when it is in the expanded disposition, and they resiliently retract the inflatable member when it is in the deflated disposition, positioning the inflatable member adjacent the perimeter of the opening. Further, in the preferred embodiment, the inflatable member is provided with an interior retainer partition which extends between the opposite side walls of the inflatable member at intermediate points in the inward extents thereof when the inflatable member is in its inflated disposition to maintain the walls in reduced spaced relation so that the inflatable member extends substantially inwardly into the opening. As a result of the unique structural features of the seal of the instant invention, including the construction of the inflatable member so that it extends inwardly for engagement with the surfaces of the walls of the body of a vehicle, the resilient recoil members which retract the inflatable member, and the retainer partition in the inflatable member, it provides a novel and effective means for sealing the open area between the perimeter of an opening in a wall of a building and the body of a vehicle when the vehicle is received in the opening. Specifically, the inflatable member engages the outer surfaces of the walls of the vehicle when it is in its expanded disposition, and the retainer partition retains the walls of the inflatable member so that the inflatable member extends substantially inwardly into the opening. The resilient recoil members are operable for retracting the inflatable member so that when it is in its deflated disposition, it is retracted and positioned adjacent the perimeter of the opening so that it does not interfere with the movement of the vehicle and so that it is not inadvertently caught or torn during movement of the vehicle into and out of the opening.

Accordingly, it is a primary object of the instant invention to provide an effective seal for sealing the open area between the perimeter of an opening in a wall of a building and the body of a vehicle received in the opening.

Another object of the instant invention is to provide an effective seal for sealing the open area between the perimeter of an opening in a wall of a building and the fuselage of an aircraft received in the opening.

A still further object of the instant invention is to provide an inflatable seal for an opening in the wall of a building which includes means for retracting the seal to a position wherein it is disposed adjacent the perimeter of the opening when it is deflated.

An even further object of the instant invention is to provide a seal for an opening in a wall of a building for sealing the open area between the perimeter of the opening and the walls of a vehicle received therein, wherein the seal effectively compensates for minor misalignments of the vehicle body with respect to the opening.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 6 is an enlarged sectional view taken along line 6—6 in FIG. 3; and

FIG. 7 is an enlarged sectional view taken along line 7—7 in FIG. 4.

DESCRIPTION OF THE INVENTION

Figure 1:
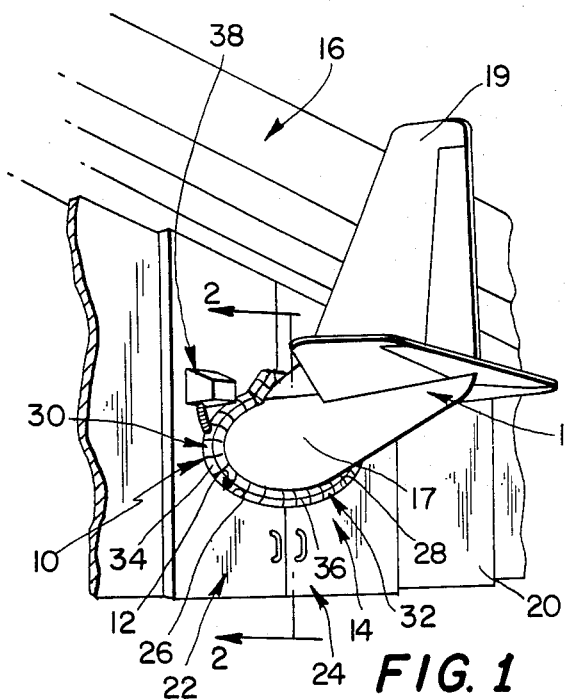
FIG. 1 is a perspective view of the seal of the instant invention mounted in an opening defined by a pair of aircraft hangar doors, with the fuselage of an aircraft received therein.
Figure 2:
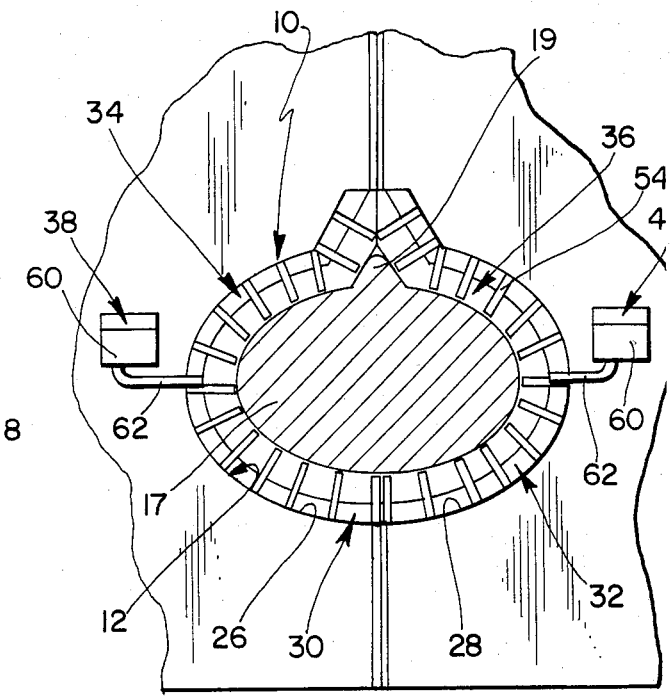
FIG. 2 is an enlarged sectional view thereof taken along line 2—2 in FIG. 1.
Figure 3:
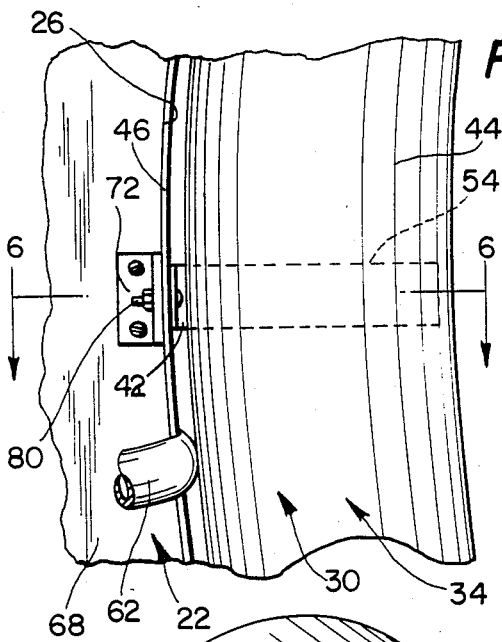
FIG. 3 is an enlarged fragmentary side elevational view of the seal in the collapsed disposition thereof.
Figure 4:
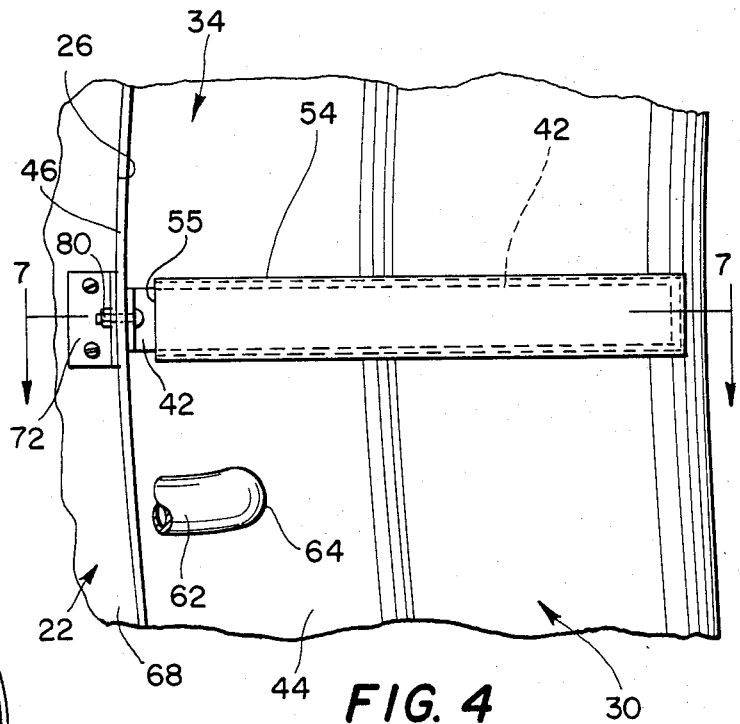
FIG. 4 is a similar view of the seal in the expanded disposition thereof.

Referring now to the drawings, the inflatable seal of the instant invention is illustrated and generally indicated at 10 in FIGS. 1 through 4, 6 and 7. The seal 10 as herein embodied is operative for providing an effective seal between the perimeter of an opening 12 in a wall 14 of a building generally indicated at 16 and the body or fuselage 17 of an aircraft 18 having a tail section 19, when the fuselage 17 is received in the opening 12. In this regard, the seal 10 is mounted on the wall 14 so that it extends inwardly into the opening 12 for engagement with the sides of the walls of the aircraft 18 in a manner which will hereinafter be more fully described.

The building 16 comprises an airplane hangar wherein the major portions of the aircraft 18 are received, and the wall 14 comprises a plurality of slidable panel sections 20 and a pair of mating slidable door panels 22 and 24 which cooperate to define the opening 12, the panels 22 and 24 defining halves 26 and 28, respectively, of the opening 12. In this regard, the opening 12 as herein illustrated is of generally oval configuration having an arch-shaped area in the upper central portion thereof for receiving the rear portion of the fuselage 17. The seal 10 as herein embodied is configured so that it conforms to the perimeter of the opening 12 for sealing the area between the panels 22 and 24 and the fuselage 17. It will be understood that a variety of other configurations of the seal of the instant invention are contemplated, whereby it is adapted for receiving aircraft of other dimensions and configurations, as well as other types of vehicles. In the embodiment of the instant invention herein illustrated, however, the seal 10 comprises two separate seal halves 30 and 32 which are mounted in the opening halves 26 and 28, respectively; and accordingly the halves 30 and 32 move with the panels 22 and 24, respectively, to permit removal of the aircraft 18 from the opening 12 or for installing it therein.

The seal halves 30 and 32 define separate seal assemblies comprising inflatable members 34 and 36, respectively, and blower assemblies 38 and 40, respectively, which are interconnected to the inflatable members 34 and 36, respectively, for maintaining them in inflated dispositions. Also included in each of the halves 30 and 32 is a plurality of resilient recoil members 42 for retracting the inflatable members 34 and 36 so that they are positioned adjacent the perimeter of the opening 12 when the blower assemblies 38 and 40 are deenergized.

The inflatable members 34 and 36 are preferably constructed of a vinyl-coated polyester fabric, and they are preferably configured so that when they are inflated with the blower assemblies 38 and 40, respectively, they define enclosed tubular areas in the respective opening halves 26 and 28, respectively, the enclosed tubular areas, however, not necessarily being air tight. In this regard, referring to FIG. 7, the expanded configuration of the inflatable member 34 is sectionally illustrated, it being understood that the inflatable member 36 is of similar configuration and construction. The inflatable members 34 and 36 comprise inflatable main portions 44 of generally tubular configuration which are preferably integrally formed from a fabric material of the above-described type with substantially flat inner mounting sleeves 46. Suitable retaining means, such as stitching 48, is provided for interconnecting an edge of each of the main portions 44 to the respective sleeve 46 and also for forming the sleeves 46 in the configuration illustrated. Also provided in the inflatable members 34 and 36 are flexible interior partitions 50 which are secured to the opposite side walls of the main portions 44 with stitching 52 to restrict the outward bulging of the main portions 44 and thereby provide generally elongated cross-sectional configurations thereof when the inflatable members 34 and/or 36 are in the expanded dispositions thereof. In this regard, the partitions 50 are preferably constructed of a flexible fabric material which either has a plurality of apertures therethrough or is of an open-weave configuration to permit the passage of air therethrough so that the main portions 44 can be maintained in fully-inflated dispositions simply by introducing air through one point in each of the main portions 44. The partitions 50 are preferably secured to the main portions 44 so that when the inflatable members 34 and/or 36 are in the inflated dispositions thereof, the partitions 50 extend in substantially parallel relation to the respective mounting sleeves 46 thereof at substantially the midpoints in the extents of the respective inflatable members 34 and/or 36 into the opening 12. Provided along the outer side of each of the inflatable members 34 and 36 is a plurality of spaced elongated recoil member pockets 54 which are preferably also made of a suitable durable fabric material and are secured to the respective main portions 44 by stitching or the like so that they extend generally inwardly into the opening 12 when the respective inflatable members 34 and/or 36 are in the expanded dispositions thereof. The pockets 54 are preferably formed with openings 55 therein which are disposed adjacent the respective mounting sleeves 46 for receiving the recoil members 42 in the pockets 54.

Figure 5:
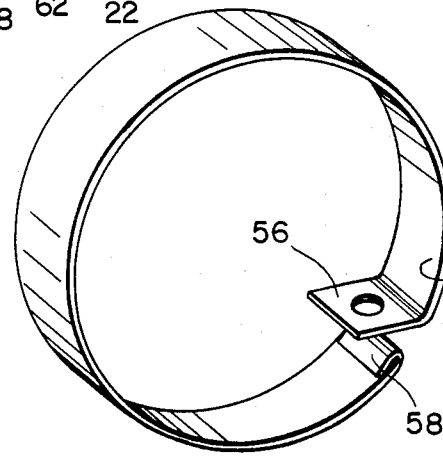
FIG. 5 is a perspective view of a resilient recoil member of the seal in the resiliently curled disposition thereof.

Referring to FIG. 5, one of the resilient recoil members 42 is more clearly illustrated. The recoil members 42 preferably comprise elongated metallic strips which are preferably constructed of spring steel or the like, and they are preferably formed so that when they are in the normal or relaxed dispositions thereof they have curled configurations as illustrated in FIG. 5, but so that they are resiliently movable to straightened configurations upon the application of suitable forces thereto. Specifically, the recoil members 42 are formed so that when the inflatable members 34 and/or 36 are inflated with the respective blower assemblies 38 and/or 40, they are moved to the substantially straight configurations thereof, but so that when the respective blower assemblies 38 and/or 40 are deenergized, they resiliently return to the curled configurations thereof to retract the respective main portions 44. Each of the retaining members 42 is further preferably formed so that it includes a mounting portion 56 at one end thereof and a curled end 58 thereof which reduces the wear between the retaining member 42 and the respective pocket 54.

The blower assemblies 38 and 40 comprise conventional air blowers 60 which, as herein illustrated, are provided with protective outer housings for the protection thereof against the elements, and collapsible fabric tubes 62 for conducting air from the blowers 60 to the inflatable members 34 and 36. The blowers 60 are mounted on the door panels 22 and 24 adjacent the seal halves 30 and 32, and the tubes 62 extend from the blowers 60 to the adjacent inflatable members 34 and 36, respectively. In this regard, the interconnection of the tube 62 associated with the blower assembly 38 to the inflatable member 34 is illustrated in FIGS. 3, 4, 6 and 7. As will be noted, the end of the tube 62 is attached to the inflatable member 34, in particular the main portion 44 thereof, with stitching or the like as at 64 in a manner which provides communication between the tube 62 and the interior of the main portion 44. As illustrated in FIG. 6, the tube 62 is collapsible so that when the respective blower 60 is deenergized it does not interfere with the operation of the respective recoil members 42. The blowers 60 are preferably dimensioned for maintaining the respective inflatable members 34 and 36 in inflated dispositions with air pressures in the range of approximately one PSI therein.

While it will be understood that a variety of different types of mounting assemblies will be appropriate for mounting the seals of the instant invention in various types of openings for various applications, in the embodiment herein illustrated the panels 22 and 24 include channel members 66 which define the respective opening halves 26 and 28. The channel members 66 are secured to sheet framing 68 of the panels 22 and 24 adjacent interior frame elements 70 thereof. Also provided in the panels 22 and 24 are angle members 72 which are secured to the respective channel members 66 with bolt and nut assemblies 76 at spaced locations around the perimeters of the opening halves 26 and 28. The seal halves 30 and 32 are secured to the panels 22 and 24, respectively, so that the mounting sleeves 46 overlay the surfaces of the channel members 66 which face inwardly in the opening 12. In this regard, elongated backing plates 78 are received in the sleeves 46, and bolt and nut assemblies 80 secure the seal halves 30 and 32 to the angle members 72 so that the backing plates and the sleeves 46 substantially coextend with the channel members 66 around the perimeters of the opening halves 26 and 28. Further in this regard, as will be seen most clearly from FIGS. 6 and 7, the nut and bolt assemblies 80 also extend through the mounting portions 56 of the recoil members 42 of the seal halves 30 and 32 to mount the recoil members 42 on the panels 22 and 24 as well. It will be noted that when the inflatable members 34 and 36, including the recoil members 42 thereof, are mounted in the manner herein illustrated, the recoil members 42 are disposed on the surfaces of the seal halves 30 and 32 which face the exterior of the hangar 16, and they are oriented so that when they are in the relaxed or curled dispositions thereof illustrated in FIG. 6, they are curled generally towards the exterior of the hangar 16. It will be understood, however, that other embodiments of the seal of the instant invention are contemplated, such as wherein the recoil members 42 are mounted on the inwardly facing surfaces of the inflatable members 34 and 36 so that the members 42 curl generally towards the interior of the hangar 16.

For use and operation of the seal 10, the plane 18 is positioned in substantially the desired orientation in the hangar 16, and the panels 22 and 24 are closed so that they cooperate to define the opening 12. The outer surfaces of the plane 18 are disposed in spaced relation to the perimeter of the opening 12. In order to seal the area between the perimeter of the opening 12 and the outer surfaces of the plane 18, the blower assemblies 38 and 40 are energized to urge the inflatable members 34 and 36, respectively, to their inflated dispositions. More specifically, when the blower assemblies 38 and 40 are energized, the inflatable members 34 and 36 are inflated so that they extend inwardly into the opening 12 in the manner illustrated in FIG. 7 and so that the recoil members 42 are urged to substantially straightened configurations. In this regard, the blowers 60 are constructed to provide air pressures in the main portions 44 which are sufficient to maintain the recoil members 42 in substantially straightened dispositions wherein they extend inwardly in the opening 12 and to maintain the inflatable members 34 and 36 in the inflated dispositions thereof without causing unnecessary stresses thereon. Since the inflatable members 34 and 36 are not necessarily intended to be air tight and, in fact, may include drainage holes for condensation drainage, the blowers 60 must be maintained energized during periods when the seal 10 is in use to maintain the inflatable members 34 and 36 in the inflated dispositions thereof. In any case, when the members 34 and 36 are inflated, they extend inwardly in the opening 12 for intimate engagement with the outer surfaces of the walls of the fuselage 17 of the plane 10, and the partitions 50 maintain the inflatable members 34 and 36 in inwardly extending relation by restricting inflation of the seals between the top and bottom walls thereof as viewed in FIG. 7. Accordingly, because of the relatively large amount of inward expansion which can be achieved with the inflatable members 34 and 36, they effectively compensate for slight misorientations of the plane 18 and also for various degrees of loading thereof. Specifically, because of the unique construction of the inflatable members 34 and 36, if the plane 18 is slightly misaligned with respect to the opening 12 so that the outer surfaces of some portions of the plane 18 are closer to the perimeter of the opening 12 than other portions thereof, when the blowers 60 are energized, the appropriate portions of the inflatable members 34 and 36 will be inflated to greater or lesser extents so that they nevertheless sealingly engage the fuselage 17 to effectively seal the area therearound. Thereafter, when it is desired to remove the plane 18 from the hanger 16, the blowers 60 are deenergized, and the recoil members 42 are automatically resiliently curled forwardly with respect to the hangar 16 to cause the members 34 and 36 to be retracted as they are deflated to position them adjacent the perimeter of the opening 12. In this manner, the recoil members 42 retract the inflatable members 34 and 36 from engagement with the plane 18 so that they are not inadvertently caught or torn during the subsequent movement of the plane 18. After the blower assemblies 38 and 40 have been deenergized and the members 34 and 36 have been retracted, the panels 22 and 24 may be separated to remove the plane from the hanger 16.

It is seen, therefore, that the instant invention provides an effective seal between the perimeter of an opening in a wall of a building and the body of a vehicle received in the opening. The seal of the instant invention effectively compensates for minor misalignments of the vehicle in the opening and provides an effective weatherproof seal between the body of the vehicle and the perimeter of the opening. Further, the recoil members 42 recoil the inflatable members 34 and 36 of the seal prior to and subsequent to the use thereof so that they are not inadvertently caught or torn during movement of the vehicle to and from the opening. Accordingly, for these reasons as well as the other reasons hereinabove set forth, it is seen that the inflatable seal of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An inflatable seal for sealing the area between the perimeter of an opening in a wall of a building and a vehicle body received in the opening comprising:
   a. an inflatable member mounted on said building wall in said opening and inflatable from a collapsed disposition to an expanded disposition wherein it projects inwardly into said opening for sealing engagement with the outer surfaces of the walls of said vehicle body;
   b. means for inflating said inflatable member; and
   c. means resiliently retracting said inflatable member to a position adjacent the perimeter of said opening when said inflating means is deenergized, said resilient retracting means comprising a plurality of resilient recoil members attached to said inflatable member, said resilient recoil members being disposed in substantially straightened positions thereof wherein they extend inwardly into said opening when said inflatable member is in the expanded disposition thereof and resiliently curled normal positions thereof wherein they are positioned adjacent the perimeter of said opening to retract said inflatable member when it is in the collapsed disposition thereof.

2. In the inflatable seal of claim 1, said inflatable member having a plurality of elongated pockets formed therein which extend inwardly into said opening when said inflatable member is in the expanded disposition thereof, said resilient recoil members being disposed within said pockets.

3. In the inflatable seal of claim 1, said resilient recoil members being secured to said building wall.

4. An inflatable seal for sealing the area between the perimeter of an opening in a wall of a building and a vehicle body received in the opening comprising:

a. an inflatable member mounted on said building wall in said opening and inflatable from a collapsed disposition to an expanded disposition wherein it projects inwardly into said opening for sealing engagement with the outer surfaces of the walls of said vehicle body;

b. means for inflating said inflatable member; and c. a plurality of resilient recoil members connected to said inflatable member for resiliently retracting it to a position adjacent the perimeter of said opening when said inflatable means is deenergized.

* * * * *